(12) United States Patent
Radermacher

(10) Patent No.: US 8,444,908 B2
(45) Date of Patent: May 21, 2013

(54) POLYOLEFIN COMPOSITION FOR INJECTION STRETCH BLOW MOLDING

(75) Inventor: Fabienne Radermacher, Obaix (BE)

(73) Assignee: Total Petrochemicals Research Feluy, Seneffe (Feluy) (BE)

( * ) Notice: Subject to any disclaimer, the term of this patent is extended or adjusted under 35 U.S.C. 154(b) by 895 days.

(21) Appl. No.: 12/375,597

(22) PCT Filed: Jul. 26, 2007

(86) PCT No.: PCT/EP2007/057735
§ 371 (c)(1),
(2), (4) Date: Oct. 8, 2009

(87) PCT Pub. No.: WO2008/015161
PCT Pub. Date: Feb. 7, 2008

(65) Prior Publication Data
US 2010/0035009 A1 Feb. 11, 2010

(30) Foreign Application Priority Data
Jul. 31, 2006 (EP) .................................. 06118161

(51) Int. Cl.
*B29C 49/06* (2006.01)
*B29C 49/08* (2006.01)

(52) U.S. Cl.
USPC ........................... 264/532; 264/523; 264/537

(58) Field of Classification Search
None
See application file for complete search history.

(56) References Cited

U.S. PATENT DOCUMENTS 5,658,627 A * 8/1997 Fujimaki et al. ............ 428/36.92
2003/0195299 A1 * 10/2003 Stevens et al. ................ 525/240
2005/0173844 A1 * 8/2005 Vermeersch et al. ......... 264/537

FOREIGN PATENT DOCUMENTS

| EP | 1211289 A1 | 6/2002 |
| EP | 1510547 A | 3/2005 |
| WO | 2005005143 A | 1/2005 |

* cited by examiner

*Primary Examiner* — Monica A Huson

(57) ABSTRACT

The present invention relates to an injection-stretch blow molding process (ISBM) for the manufacture of an impact-resistant container with good optical properties from a polyolefin composition comprising a polypropylene and a polyethylene produced with a metallocene-based catalyst.

20 Claims, No Drawings

POLYOLEFIN COMPOSITION FOR INJECTION STRETCH BLOW MOLDING

FIELD OF THE INVENTION

The present invention relates to an injection-stretch blow molding process for the production of containers with good impact and optical properties using a polyolefin composition comprising a polypropylene and a polyethylene, which is produced by using a metallocene catalyst.

THE PRIOR ART AND THE TECHNICAL PROBLEM

Injection-stretch blow molding (ISBM) is a process widely used for the production of containers, such as bottles, using thermoplastic polymers. The process includes the steps of preparing a pre-form by injection molding and then expanding the pre-form to the desired final shape. In general, one distinguishes one-stage and two-stage processes. In the one-stage process the steps of producing the pre-form and expanding the pre-form to the desired final shape are performed in the same machine. In the two-stage process these two steps are performed in different machines, in some cases even in different geographical locations; the pre-form is allowed to cool to ambient temperature and is then transported to a second machine where it is reheated and expanded to the desired final shape. Due to reasons of production speed and flexibility the two-stage process is preferred for larger production volumes.

Recent progress in development has made polypropylene a viable alternative to polyethylene terephthalate (PET) for injection-stretch blow molding (ISBM). Due to their good optical properties propylene-ethylene random copolymers are the preferred polypropylene grades.

For the injection molding of polypropylene it is well known to improve the impact performance, while also having good optical properties, by the addition of a polyethylene, which has been produced using a metallocene catalyst.

WO 2005/005143 discloses blow-molded containers made from a blend of polypropylene and a metallocene polyethylene to improve the impact strength.

The polypropylenes presently used in injection-stretch blow molding applications allow for the production of containers with good optical properties at industrially viable production rates. However, as compared to other polymers used in injection-stretch blow molding polypropylene suffers from a lack of impact strength, particularly at lower temperatures, i.e. at temperatures below room temperature.

Thus, there is an interest for improving the impact performance of injection-stretch blow molded polypropylene containers while maintaining acceptable optical properties.

BRIEF DESCRIPTION OF THE INVENTION

We have now discovered a process that allows the production of injection-stretch blow molded polypropylene containers with improved impact properties and good optical properties.

Therefore the present invention relates to Injection-stretch blow molding process for the manufacture of an impact-resistant container with good optical properties comprising the step of
(a) providing a polyolefin composition comprising a polypropylene and a polyethylene, said polypropylene being a homopolymer or a random copolymer of propylene and a comonomer selected from the group consisting of ethylene and $C_4$-$C_{10}$ alpha-olefins, and said polyethylene having been produced using a metallocene catalyst,
(b) preparing a pre-form from said polyolefin composition by injection molding at an injection temperature of at least 230° C., preferably at least 250° C., most preferably at least 270° C.,
(c) optionally cooling the pre-form to room temperature,
(d) optionally re-heating the pre-form to a temperature in the range from 90° C. to 140° C.,
(e) stretching the preform axially by a center rod, and
(f) blowing the pre-form radially with a gas under pressure.

In addition the present invention relates to a container produced with such a process.

DETAILED DESCRIPTION OF THE INVENTION

Polypropylene Component

The polypropylenes used in the present invention can be homopolymers, random copolymers or heterophasic copolymers. Homopolymers and random copolymers are preferred. Random copolymers are most preferred. The random copolymers and heterophasic copolymers are copolymers of propylene and at least one comonomer, said comonomer selected from the group consisting of ethylene and $C_4$-$C_{10}$ alpha-olefins, such as 1-butene, 1-pentene, 1-hexene, 1-octene.

The random copolymers used in the present invention comprise up to 6 wt %, preferably up to 5 wt % and most preferably up to 4 wt % of at least one comonomer. They comprise at least 0.1 wt %, more preferably at least 0.5 wt %, even more preferably at least 1 wt % and most preferably at least 2 wt % of at least one comonomer. Preferably, the random copolymers are copolymers of propylene with ethylene as comonomer.

The heterophasic copolymers used in present invention comprise a matrix, which in turn is made of propylene homopolymer or random copolymer as defined above, and a rubber phase. Preferably, the heterophasic copolymers are copolymers of propylene and ethylene. They have an ethylene content in the range from 4 wt % to 15 wt %. The heterophasic copolymers comprise from 5 wt % to 35 wt % of a rubber phase. Preferably, the rubber phase is an ethylene propylene rubber.

The polypropylenes used in the present invention can be produced by polymerizing propylene and one or more optional comonomers in the presence of a Ziegler-Natta catalyst system or a metallocene-based catalyst system, both of which are well-known to the skilled person. A Ziegler-Natta catalyst system comprises a titanium compound having at least one titanium-halogen bond and an internal electron donor, both on a suitable support (for example on a magnesium halide in active form), an organoaluminium compound (such as an aluminium trialkyl), and an optional external donor. A metallocene-based catalyst system comprises a metallocene, optionally on a suitable support, a cocatalyst, such as an aluminoxane, and optionally a second organoaluminium compound, such as an aluminium trialkyl.

The polymerization of propylene and one or more optional comonomers can be carried out in a slurry, bulk or gas phase process. In a slurry process the polymerization is carried out in a diluent, such as an inert hydrocarbon. In a bulk process the polymerization is carried out in liquid propylene as reactor medium. The production of heterophasic copolymers is preferably carried out in at least one polymerization reactor of slurry, bulk or gas phase type, in series with at least one gas phase reactor. This is done for example in a polypropylene production line based on Spheripol technology.

The average molecular weight and by consequence the melt flow of the polypropylene produced in a polymerization reactor is controlled by adding hydrogen during the polymerization. The polypropylenes used in the present invention have a melt flow index of 50 dg/min or less, preferably of 30 dg/min or less, more preferably of 18 dg/min or less and most preferably of 15 dg/min or less. They have a melt flow index of 1 dg/min or more, preferably of 5 dg/min or more, and most preferably of 8 dg/min or more. The melt flow index is determined according to ISO 1133, condition L.

Polyethylene Component

The polyethylenes used in the present inventions can be homopolymers or copolymers of ethylene and at least one comonomer, said comonomer being a $C_3$ to $C_{10}$ alpha-olefin, such as 1-butene, 1-pentene, 1-hexene, 1-octene, 1-methyl-pentene, with 1-butene and 1-hexene being the preferred comonomers and 1-hexene being the most preferred comonomer.

The polyethylenes used in the present invention are metallocene polyethylenes, i.e. they have been produced using a metallocene-based catalyst system, which comprises a metallocene, optionally a support and a cocatalyst.

For the purposes of the present invention any known metallocene can be used, such as for example bis(n-butyl)zirconium dichloride. It is, however, preferred to use a metallocene of the following general formula

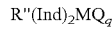

wherein Ind is an indenyl or a tetrahydroindenyl, substituted or unsubstituted, R" is a structural bridge imparting rigidity between the two indenyls and is a $C_1$-$C_4$ alkylene radical, a dialkyl germanium or silicon or siloxane, or a alkyl phosphine or amine radical, preferably $Me_2C$, ethylene, $Ph_2C$ or $Me_2Si$; M is a group 4, 5 or 6 transition metal; Q is a hydrocarbyl radical such as aryl, alkyl, alkenyl, alkylaryl, or aryl alkyl radical having from 1 to 20 carbon atoms, hydrocarboxy radical having from 1 to 20 carbon atoms or halogen and can be the same or different from each other; and q is the valence of M minus 2.

Preferably, the indenyls or tetrahydroindenyls, if substituted are symmetrically substituted in positions 2 and/or 4, and more preferably they are unsubstituted.

Such metallocene components are disclosed in WO 96/35729. The most preferred metallocene is ethylenebis(4,5,6,7-tetrahydro-1-indenyl)zirconium dichloride.

The metallocene may be supported according to any method known in the art. In the event it is supported, the support used in the present invention can be any organic or inorganic solid, particularly porous supports such as talc, inorganic oxides, and resinous support material such as polyolefin. Preferably, the support material is an inorganic oxide in its finely divided form.

The cocatalyst is an aluminium compound that has an ionizing effect and thus creates an active polymerization site on the metallocene. Preferably the aluminium compound is an alumoxane or an aluminium alkyl. More preferably the aluminium compound is an alumoxane. Most preferably the aluminium compound is methylalumoxane.

Alumoxanes suitable as cocatalysts comprise oligomeric linear and/or cyclic alkyl alumoxanes, represented by the formulas R—(Al(R)—O)$_n$—AlR$_2$ for oligomeric, linear alumoxanes, and (—Al(R)—O—)$_m$ for oligomeric, cyclic alumoxanes, wherein n is from 1 to 40, preferably from 10 to 20, m is from 3 to 40, preferably from 3 to 20, and R is a $C_1$-$C_8$ alkyl group and preferably methyl.

Aluminium alkyls suitable as cocatalysts are represented by the formula AlR$_3$, wherein each R is the same or different and is selected from halides or from alkoxy or alkyl groups having from 1 to 12 carbon atoms. A particularly suitable aluminiumalkyl is trialkylaluminium, the most preferred being triisobutyl-aluminium (TIBAL).

The polymerization of the metallocene-produced polyethylene can be carried out in gas, solution or slurry phase. Polymerization in slurry phase is used to prepare the medium and high density polyethylene. Gas phase polymerization is preferred to prepare low density polyethylene. Solution polymerization is preferred for the production of very low density polyethylene. The polymerization temperature ranges from 20° C. to 125° C., preferably from 60° C. to 95° C. and the pressure ranges from 0.1 MPa to 5.6 MPa, preferably from 2 MPa to 4 MPa, for a time ranging from 10 minutes to 4 hours, preferably from 1 and 2.5 hours.

A continuous single loop reactor is preferably used for conducting the polymerization under quasi steady state conditions. A double loop reactor may also be used when a bi-modal resin is desired.

The polyethylene resin used in the present invention can be prepared with either a single site metallocene catalyst, in a one- or two-loop reactor or with a catalyst system comprising several single site components and it has therefore either a monomodal or a bimodal molecular weight distribution (MWD). A narrow molecular weight distribution is preferred. The molecular weight distribution can be completely defined by means of a curve obtained by gel permeation chromatography. Generally the molecular weight distribution is more simply defined by a parameter known as the dispersion index D, which is the ratio between the average molecular weight by weight ($M_w$) and the average molecular weight by number ($M_n$). The dispersion index constitutes a measure of the width of the molecular weight distribution. It is of from 2 to 7, preferably of from 2 to 5.

During the polymerization hydrogen is used to control the average molecular weight and in consequence the melt index of the polyethylene. The polyethylenes used in the present invention have a melt index, measured according to ISO 1133, condition D, at a temperature of 190° C. and a load of 2.16 kg, in the range from 5 dg/min to 30 dg/min.

The density of the polyethylene is regulated by the amount of comonomer(s) in the polyethylene. A lower density requires a higher amount of comonomers than a higher density. The polyethylenes used in the present invention have a density of at least 0.920 g/cm$^3$, preferably of at least 0.925 g/cm$^3$, more preferably of at least 0.927 g/cm$^3$, even more preferably of at least 0.930 g/cm$^3$, and most preferably of at least 0.932 g/cm$^3$. They have a density of at most 0.965 g/cm$^3$, preferably of at most 0.960 g/cm$^3$, more preferably of at most 0.955 g/cm$^3$, even more preferably of at most 0.950 g/cm$^3$, and most preferably of at most 0.945 g/cm$^3$. The density is measured at 23° C. following the method described in ASTM D 1505.

Without wishing to be bound by theory, it is believed that the amount of crystallization plays a role in the compatibility between metallocene-produced polyethylene and polypropylene, when measured at high temperature or at low equivalent Short Chain Branches (SCB) content. The amount of crystallization as a function of short chain branches is studied by the Stepwise Isothermal Segregation Technique (SIST). In this technique, the sample is heated from room temperature (25° C.) to 220° C. at a rate of 200° C./min. It is kept at 220° C. for 5 minutes. It is then dropped to the temperature of 140° C. at a rate of 20° C./min and kept at that temperature for 40 minutes. The temperature is then dropped by steps of 5° C. at a rate of 20° C./min and kept at each step for 40 minutes until the temperature of 90° C. is reached. It is then allowed to cool down to 25° C. at the fastest cooling rate and maintained at 25° C. for 3 minutes. It is next reheated from 25° C. to 180° C. at a rate of 5° C./min. The percentage of crystallization is deduced from the curve representing the SCB as a function of melting temperature following the method described by Satoru Hosada in Polymer Journal, vol. 20, p. 383, 1988. In the metallocene-produced polyethylene used in the present invention, the percentage of crystallization corresponding to chains having less than 10 SCB for 1000 carbon atoms is at least 4%, preferably it is at least 7%.

Polyolefin Composition

The polyolefin composition of the present invention comprises at least 1 wt %, preferably at least 2 wt % metallocene polyethylene. The polyolefin composition of the present invention comprises at most 20 wt %, preferably at most 15 wt % and most preferably at most 10 wt % metallocene polyethylene. The preferred polyolefin compositions essentially consist of metallocene polyethylene and polypropylene.

The polyolefin composition can be prepared by dry-blending or compounding of the polypropylene and the metallocene polyethylene. It is also possible to conduct the compounding during the pelletization step in a polypropylene production facility.

Both, the polypropylene as well as the polyethylene may contain additives such as, by way of example, antioxidants, light stabilizers, acid scavengers, lubricants, antistatic additives, nucleating/clarifying agents, and colorants. An overview of such additives may be found in Plastics Additives Handbook, ed. H. Zweifel, 5$^{th}$ edition, 2001, Hanser Publishers.

Injection-Stretch Blow Molding

The injection-stretch blow molding process of the present invention can either be a one-stage or a two-stage process. In a one-stage process injection molding of the preform and blowing of the preform to the final desired shape are performed on the same machine, whereas in a two-stage process injection-molding of the preform and blowing of the preform are conducted in different machines, which can be separated by a long distance. Thus, the two-stage process additionally requires the cooling of the preform to ambient temperature and a subsequent reheating before the blowing step.

It has now been surprisingly found that under stretching and blowing conditions similar to those used for pure polypropylene, containers with good transparency can be obtained, meaning that no phase separation between the polypropylene and the metallocene polyethylene has been observed. This is in particular surprising as polypropylene and polyethylene are in general considered to be non-miscible and therefore tend to separate in high shear conditions such as are found in the stretching and blowing steps of the injection-stretch blow molding process.

The preform, which has an open and a closed end, is prepared by injection molding. For the present invention a polyolefin composition comprising a polypropylene and a metallocene polyethylene are fed to an extruder, plasticized and injected under pressure into an injection mold through an opening, generally referred to as "gate". The polyolefin composition is injected into the injection mold at an injection temperature of at least 230° C., preferably of at least 250° C., and more preferably of at least 270° C. The injection temperature is at most 300° C., preferably at most 290° C. and most preferably at most 280° C. The choice of injection temperature depends upon the melt flow index of the polyolefin composition. It is clear to the skilled person that a lower melt flow index requires a higher injection temperature and vice versa. The injection mold is filled at such a rate as to give a ratio of mold filing rate (in cm$^3$/s) over gate size (in mm) of 15 or less, preferably of 10 or less. The preform is cooled inside the injection mold and removed from it. The ratio of mold filling rate over gate size varies depending upon the viscosity of the molten polyolefin composition, i.e. a more viscous molten polyolefin composition requires a lower value for the ratio than a more fluid molten polyolefin composition, so that a preform with good processing properties in the subsequent stretch-blowing steps will be obtained.

In a one-stage process the preform is cooled to a temperature in the range from 90° C. to 140° C. and is stretch-blown into a container. All of these steps are performed on a single machine.

In a two-stage process the preform is allowed to cool to ambient temperature and transported to a different machine. The preforms are uniformly reheated to a temperature in the range from 90° C. to 140° C. The reheating can be followed by an equilibration step. Subsequently, the preform is transferred to the stretch-blowing zone and secured within the blowing mold, which has the same shape as the final container, in such a way that the closed end of the preform points to the inside of the blowing mold. The preform is stretched axially with a center rod, generally referred to as "stretch rod" to bring the wall of the perform against the inside wall of the blowing mold. The stretch rod speed can go up to 2000 mm/s. Preferably it is in the range from 100 mm/s to 2000 mm/s, and more preferably in the range from 500 mm/s to 1500 mm/s. Pressurized gas is used to radially blow the preform into the blowing mold shape. The blowing is done using gas with a pressure in the range from 5 bars to 40 bars, and preferably from 10 bars to 30 bars.

The blowing of the preform can also be performed in two steps, by first pre-blowing the preform with a lower gas pressure, and then blowing the preform to its final shape with a higher gas pressure. The gas pressure in the pre-blowing step is in the range from 2 bars to 10 bars, preferably in the range from 4 bars to 6 bars. The preform is blown into its final shape using gas with a pressure in the range from 5 bars to 40 bars, more preferably from 10 bars to 30 bars, and most preferably from 15 bars to 25 bars.

Following the stretching and blowing, the container is rapidly cooled and removed from the blowing mold.

The containers obtained by the injection-stretch blow molding process of the present invention are characterized by good impact properties in combination with good optical properties. Additionally, they are characterized by the fact that less energy is required during the reheat step than is the case for polypropylene alone. The containers also offer the advantage of improved weldability. This is particularly interesting in applications requiring seals or lids that for tamper-proofing are welded directly onto the container. The improved weldability of the polyolefin compositions used in the present invention is particularly evident in the fact that the welding temperature required to achieve a target of 50% of the mechanical properties, e.g. in a traction test, is substantially lower than that for the respective pure polypropylene.

EXAMPLES

The following examples illustrate the invention. The polypropylene used for the examples is a random copolymer of propylene and ethylene with 3-3.2 wt % of ethylene, a MFI of 10 dg/min (230° C.; 2.16 kg), a solid state density of 0.902 g/cm$^3$ (measured according to ISO 1183), a molten state density of 0.747 g/cm$^3$ and a nucleating agent; it has been produced using a commercial Ziegler-Natta catalyst. The metallocene polyethylene used for the examples is a copolymer of ethylene and 1-hexene with a density of 0.934 g/cm$^3$, a melt index of 8 dg/min (190° C., 2.16 kg) and was prepared using ethylenebis(4,5,6,7-tetrahydro-1-indenyl) zirconium dichloride. The respective polyolefin compositions used in the examples are given in table 1.

TABLE 1

|  | Unit | Comp. Ex. 1 | Ex. 1 | Ex. 2 | Comp. Ex. 2 |
|---|---|---|---|---|---|
| PP | wt % | 100 | 95 | 90 | 0 |
| mPE | wt % | 0 | 5 | 10 | 0 |
| PET | wt % | 0 | 0 | 0 | 100 |

The melt flow index (MFI) for polypropylene is measured according to ISO 1133, condition L, at 230° C. with a load of 2.16 kg. The melt index of polyethylene is determined according to ISO 1133, condition D, at a temperature of 190° C. under a load of 2.16 kg.

The preforms used in the examples were molded in a single cavity mold with a gate size of 1.25 mm on an Arburg Allrounder 370 injection molding machine. Injection molding conditions are given in table 2. The preform weighed 16.4 g and had a total height of 88.7 mm. It had a threaded neck with a height of 18.5 mm and a body with a height of 70.2 mm. The outer diameter of the body was 27.8 mm. Wall thickness of the body was 3.15 mm.

TABLE 2

|  | Unit | Comp. ex. 1 | Ex. 1 | Ex. 2 |
|---|---|---|---|---|
| Mold temperature | ° C. | 35 | 35 | 35 |
| Melt temperature | ° C. | 255 | 255 | 255 |
| Peak pressure | bar | 247 | 208 | 218 |
| Change over pressure | bar | 205 | 170 | 177 |
| Barrel temperature |  |  |  |  |
| Zone 1 | ° C. | 208 | 250 | 250 |
| Zone 2 | ° C. | 224 | 260 | 260 |
| Zone 3 | ° C. | 239 | 270 | 270 |
| Zone 4 | ° C. | 239 | 270 | 270 |
| Injection time | s | 3.1 | 3.2 | 3.2 |
| Dosing time | s | 4.7 | 6.0 | 6.1 |
| Cooling time | s | 20 | 16.5 | 16.5 |
| Total cycle time | s | 38.6 | 35.6 | 35.6 |

The preforms were formed into bottles on a two-cavity ADS G62 ISBM-machine with two ovens used for heating and three ovens used for equilibrating the preforms. Production rate was 1500 bottles per hour per cavity. The stretching rod was run at a speed of 1000 mm/s and axially stretches the preform. Once the preform had been stretched by 10 mm, gas under a pressure of 5 bar was allowed into the preform. With the combined actions of stretching rod and gas pressure the preform was further extended by 90 mm in axial direction. The final blowing step was done with gas at a pressure of 25 bars. The ISBM mold was cooled with water at a temperature of 10° C. Further operating parameters are given in table 3.

TABLE 3

|  | Unit | Comp. ex. 1 | Ex. 1 | Ex. 2 |
|---|---|---|---|---|
| Reheat - Heating ovens |  |  |  |  |
| Zone 1 | W | 1100 | 1000 | 1480 |
| Zone 2 | W | 1150 | 1400 | 1450 |
| Zone 3 | W | 350 | 560 | 830 |
| Zone 4 | W | 810 | 640 | 500 |
| Zone 5 | W | 1200 | 950 | 1000 |
| Zone 6 | W | 1000 | 910 | 1300 |
| Percentage of total capacity | % | 90 | 90 | 92 |

TABLE 3-continued

|  | Unit | Comp. ex. 1 | Ex. 1 | Ex. 2 |
|---|---|---|---|---|
| Reheat - Equilibrating ovens |  |  |  |  |
| Zone 1 | W | 1200 | 1000 | 1500 |
| Zone 2 | W | 1500 | 1430 | 800 |
| Zone 3 | W | 350 | 570 | 600 |
| Zone 4 | W | 750 | 570 | 300 |
| Zone 5 | W | 270 | 230 | 480 |
| Zone 6 | W | 780 | 750 | 840 |
| Percentage of total capacity | % | 95 | 90 | 50 |
| Total energy at 1500 bottles per hour per cavity | kW | 23.9 | 22.1 | 18.9 |
| Energy per bottle | W | 15.9 | 14.7 | 12.6 |

The total energy at a production rate of 1500 bottles per hour per cavity is calculated using the following equation:

Energy=2·Percentage of total capacity for the heating ovens·Σ(Energies for zones 1 to 6 of the heating ovens)+3·Percentage of total capacity for the equilibrating ovens·Σ(Energies for zones 1 to 6 of the equilibrating ovens)

The produced bottles had a volume of 500 ml with a total height of 201 mm, of which 18.5 mm were for the threaded neck and 182.5 mm for the body. Outer diameter of the body was 63 mm. Thus, stretching ratios from preform to final bottle were 2.60 in axial direction and 2.27 in radial direction.

Dynamic compression tests on empty open bottles as well as filled closed bottles were carried out at room temperature according to ASTM D 2659-95 on a Zwick tensile machine operated at a speed of 50 mm/min. The filled closed bottles were filled with water and stored at room temperature for 48 hours before being tested.

Drop tests were performed by vertically dropping bottles, which had been filled with water and stored at test temperature for 48 hours, onto a metal plate representing a slope of 15°. The tests were carried out at 23° C., 5° C. and −20° C. The height given in the table represents the height at which 50% of the bottles broke.

Haze was measured according to ASTM D 1003 on samples taken from the wall section of the bottles, said wall section being located about half-way between the bottom and the top of the bottle.

Traction tests were preformed on samples of 10 mm by 80 mm cut in a ring from the body of the bottle. The value for the normalized force is obtained by dividing the force at maximum by the thickness of the sample.

Results of the mechanical and optical tests are given in table 4.

TABLE 4

|  | Unit | Comp. ex. 1 | Ex. 1 | Ex. 2 | Comp. ex. 2 |
|---|---|---|---|---|---|
| Dynamic compression - Filled bottle |  |  |  |  |  |
| Strength at yield | N | 303 | 285 | 229 | 212 |
| Depth at yield | mm | 12 | 11 | 7 | 6 |
| Dynamic compression - Empty bottle |  |  |  |  |  |
| Strength at max | N | 105 | 90 | 85 | 117 |
| Depth at max | mm | 7 | 6 | 7 | 6 |
| Drop test - F50 height at |  |  |  |  |  |
| 23° C. | m | 4.7 | >6.5 | >6.5 | >6 |
| 5° C. | m | 1.2 | 2.9 | >6.5 | >6 |
| −20° C. | m | <0.5 |  | <0.5 | >6 |

TABLE 4-continued

|  | Unit | Comp. ex. 1 | Ex. 1 | Ex. 2 | Comp. ex. 2 |
|---|---|---|---|---|---|
| Haze | % | 7 | 7.2 | 8.3 | 3 |
| Traction on bottle |  |  |  |  |  |
| Force at max | N | 242 | 157 | 154 | na |
| Normalized force at max | N/mm | 53 | 45 | 53 | na |

The results clearly show a strong improvement in impact performance, as indicated by the results of the drop tests, while at the same time the optical properties of polypropylene ISBM-bottles are kept. Regarding the performance in compression tests, which is indicative of the behavior of the bottles during storage while being stacked, polypropylene-based ISBM bottles behave much better than PET-bottles.

The invention claimed is:

1. An injection-stretch blow molding process for the manufacture of an impact-resistant container with good optical properties comprising the step of
   (a) providing a polyolefin composition comprising a polypropylene and a polyethylene, said polypropylene being a homopolymer or a random copolymer of propylene and a comonomer selected from the group consisting of ethylene and $C_4$-$C_{10}$ alpha-olefins, and said polyethylene having been produced using a metallocene catalyst, wherein said metallocene polyethylene has a melt index in the range from 5 to 30 dg/min and a density of at least 0.925 g/cm$^3$,
   (b) preparing a preform from said polyolefin composition by injection molding at an injection temperature of at least 230° C.,
   (c) optionally cooling the preform to room temperature,
   (d) optionally re-heating the preform to a temperature in the range from 90° C. to 140° C.,
   (e) stretching the preform axially by a center rod, and
   (f) blowing the preform radially with a gas under pressure.

2. The injection-stretch blow molding process according to claim 1, wherein the polypropylene has a melt flow index of at most 50 dg/min, (measured according to ASTM D-1238, condition L).

3. The injection-stretch blow molding process of claim 1, wherein the polyolefin composition of step (a) comprises in the range from 1 wt % to 20 wt % of metallocene polyethylene.

4. The injection-stretch blow molding process of claim 1, wherein the metallocene polyethylene has a density of at least 0.927 g/cm$^3$.

5. The injection-stretch blow molding process of claim 1, wherein the metallocene polyethylene has a density of at most 0.965 g/cm$^3$.

6. The injection-stretch blow molding process of claim 1, wherein the metallocene polyethylene has a percentage of crystallization corresponding to chains having less than 10 Short Chain Branches (SCB) of at least 4%.

7. The injection-stretch blow molding process of claim 1, wherein in step (b) the ratio of mold filing rate (in cm$^3$/s) over gate size (in mm) is 15 or less.

8. The injection-stretch blow molding process of claim 1, wherein in step (e) the center rod speed is in the range from 100 mm/s to 2000 mm/s.

9. The injection-stretch blow molding process of claim 1, wherein step (e) comprises the steps of
   (e1) pre-blowing the preform with gas at a pressure in the range from 2 bars to 10 bars, wherein the blowing of the preform radially with the gas under pressure in step (f) is performed at a pressure in the range from 5 to 40 bars.

10. The injection-stretch blow molding process of claim 1, wherein there is no phase separation between the polypropylene and the polyethylene.

11. The injection-stretch blow molding process of claim 1, wherein the metallocene polyethylene has a density of at least 0.930 g/cm$^3$.

12. The injection-stretch blow molding process of claim 1, wherein the metallocene polyethylene has a density of at least 0.932 g/cm$^3$.

13. The injection-stretch blow molding process of claim 1, wherein the metallocene polyethylene has a density of at most 0.960 g/cm$^3$.

14. The injection-stretch blow molding process of claim 1, wherein the metallocene polyethylene has a density of at most 0.955 g/cm$^3$.

15. The injection-stretch blow molding process of claim 1, wherein the metallocene polyethylene has a density of at most 0.950 g/cm$^3$.

16. The injection-stretch blow molding process of claim 1, wherein the metallocene polyethylene has a density of at most 0.945 g/cm$^3$.

17. The injection-stretch blow molding process of claim 1, wherein the metallocene polyethylene has a percentage of crystallization corresponding to chains having less than 10 Short Chain Branches (SCB) of at least 7%.

18. The injection-stretch blow molding process of claim 1, wherein the polypropylene has a melt flow index in the range from 1 dg/min to 30 dg/min.

19. The injection-stretch blow molding process of claim 1, wherein the polypropylene has a melt flow index in the range from 5 to 15 dg/min.

20. The injection-stretch blow molding process of claim 1, wherein the injection temperature is at least 270° C.

* * * * *